United States Patent
McGowan et al.

(10) Patent No.: US 9,025,575 B2
(45) Date of Patent: May 5, 2015

(54) ANTENNA ARRAY CALIBRATION USING TRAFFIC SIGNALS

(71) Applicants: Neil McGowan, Stittsville (CA); Marthinus Willem Da Silveira, Nepean (CA); Tan Ho, Stittsvile (CA)

(72) Inventors: Neil McGowan, Stittsville (CA); Marthinus Willem Da Silveira, Nepean (CA); Tan Ho, Stittsvile (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 134 days.

(21) Appl. No.: 13/677,781

(22) Filed: Nov. 15, 2012

(65) Prior Publication Data

US 2014/0133470 A1    May 15, 2014

(51) Int. Cl.
*H04W 72/04* (2009.01)
*H04W 72/08* (2009.01)
*H04L 25/03* (2006.01)
*H04B 7/06* (2006.01)

(52) U.S. Cl.
CPC .......... *H04W 72/082* (2013.01); *H04W 72/044* (2013.01); *H04L 25/03949* (2013.01); *H04B 7/06* (2013.01); *H04B 17/12* (2015.01)

(58) Field of Classification Search
CPC .. H01Q 1/246; H04B 7/0617; H04B 17/0005; H04B 1/1027; H04B 1/0475; H04B 1/0483; H04B 1/667; H04B 15/005; H04B 17/10; H04B 17/101; H04B 17/11; H04B 17/12; H04L 2025/03426; H04L 5/026; H04L 23/02; H04L 27/01; H04L 25/03955; H04L 25/0398; H04L 25/03987; H04L 25/03019; H04L 25/03025; H04L 25/00202; H04L 25/0206; H04L 25/021; H04L 25/0212; H04L 25/022; H04L 25/0222

See application file for complete search history.

(56) References Cited

U.S. PATENT DOCUMENTS

| 6,615,024 B1 | 9/2003 | Boros et al. |
| 6,963,742 B2 * | 11/2005 | Boros et al. .................. 455/424 |
| 7,209,078 B2 | 4/2007 | Jin et al. |

(Continued)

FOREIGN PATENT DOCUMENTS

| WO | WO-03090386 | 10/2003 |
| WO | WO-2010038227 | 4/2010 |

OTHER PUBLICATIONS

International Search Report and Written Opinion, Application No. PCT/IB2013/060067, dated Jan. 23, 2014, 10 pages.

(Continued)

*Primary Examiner* — Candal Elpenord
(74) *Attorney, Agent, or Firm* — Nicholson De Vos Webster & Elliott, LLP

(57) ABSTRACT

An antenna array of a base station is calibrated using outbound traffic signals. The antenna array includes a number of sub-arrays. A combiner in the antenna array combines the outbound traffic signals in the sub-arrays into a feedback signal. The outbound traffic signals are captured simultaneously for use as reference signals before the outbound traffic signals enter transmit paths in a radio unit of the base station. Each of the reference signals is one of the outbound traffic signals that is to be transmitted via one of the sub-arrays. An impairment estimator of the base station estimates the impairment for each of the outbound traffic signals based on the feedback signal and the reference signals. An approximate inverse of the impairment estimation is applied to the outbound traffic signals by a number of equalizers before the outbound traffic signals enter the transmit paths.

21 Claims, 4 Drawing Sheets

(56) References Cited

U.S. PATENT DOCUMENTS

| | | | |
|---|---|---|---|
| 7,286,500 B1* | 10/2007 | Bhatoolaul et al. | 370/320 |
| 7,292,877 B2 | 11/2007 | Yoon et al. | |
| 7,522,847 B2* | 4/2009 | Momtaz et al. | 398/209 |
| 8,107,548 B2* | 1/2012 | Jeong et al. | 375/265 |
| 8,674,874 B2 | 3/2014 | Soualle et al. | |
| 8,929,934 B2* | 1/2015 | Chirayil | 455/501 |
| 2004/0132414 A1* | 7/2004 | Sendyk et al. | 455/73 |
| 2004/0204109 A1* | 10/2004 | Hoppenstein | 455/562.1 |
| 2004/0214604 A1* | 10/2004 | Yoon et al. | 455/562.1 |
| 2004/0228417 A1* | 11/2004 | Kennedy et al. | 375/260 |
| 2005/0207334 A1* | 9/2005 | Hadad | 370/203 |
| 2006/0240784 A1 | 10/2006 | Naguib et al. | |
| 2007/0177620 A1* | 8/2007 | Ohmuro et al. | 370/412 |
| 2007/0230638 A1 | 10/2007 | Griniasty | |
| 2008/0159357 A1* | 7/2008 | Nekoogar et al. | 375/139 |
| 2008/0225929 A1* | 9/2008 | Proctor et al. | 375/214 |
| 2009/0247095 A1* | 10/2009 | Pan | 455/115.1 |
| 2010/0048146 A1* | 2/2010 | McCallister | 455/78 |
| 2012/0001810 A1 | 1/2012 | Soualle et al. | |
| 2012/0147991 A1* | 6/2012 | Matsubara et al. | 375/296 |

OTHER PUBLICATIONS

International Search Report and Written Opinion, Application No. PCT/IB2013/060066, dated Jan. 23, 2014, 10 pages.

Non-Final Office Action, U.S. Appl. No. 13/894,826, dated Dec. 1, 2014, 10 pages.

* cited by examiner

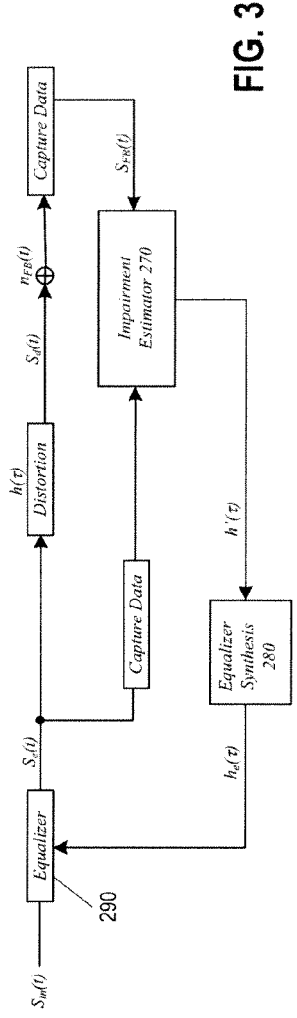
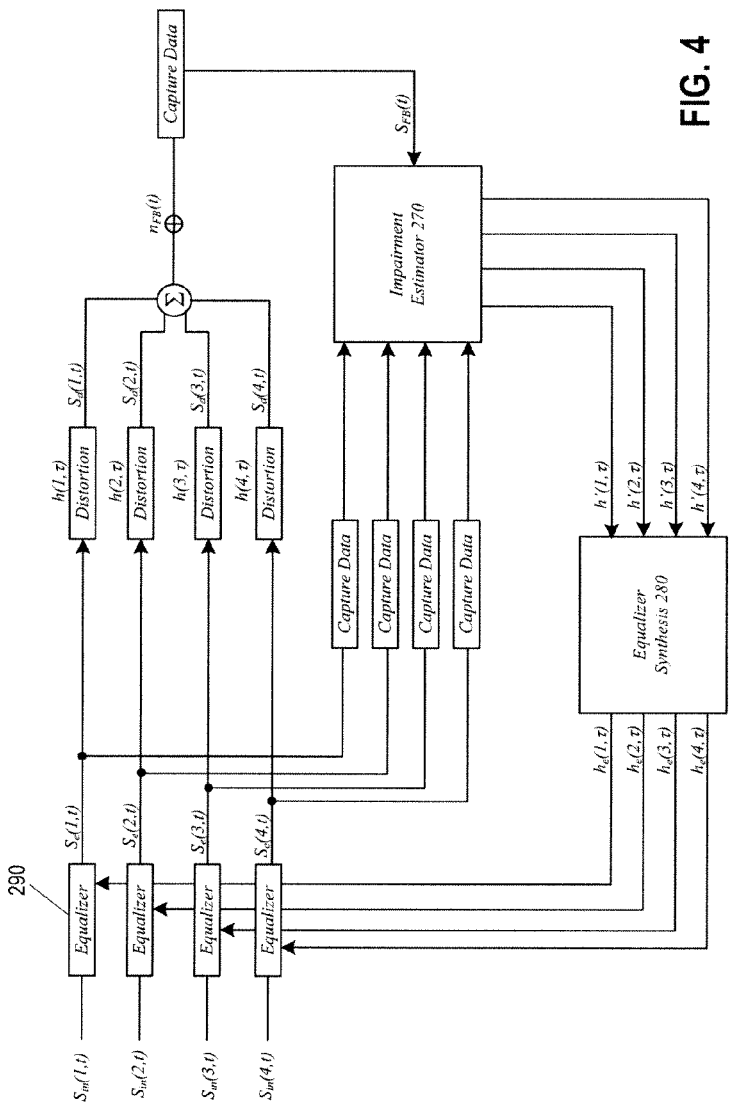
FIG. 3
FIG. 4

ANTENNA ARRAY CALIBRATION USING TRAFFIC SIGNALS

TECHNICAL FIELD

Embodiments of the invention relate to antenna array calibration; and more specifically, to antenna array calibration using outbound traffic signals to be transmitted by a radio base station (RBS).

BACKGROUND

Antenna arrays have been widely used in wireless mobile networks for directional signal transmission and reception with an increased gain compared to an omni-directional antenna. The increased gain translates into a higher cell density and data throughput. An antenna array needs to be calibrated across its sub-array paths to remove any linear phase and/or amplitude distortions (hereafter simply referred to as phase distortion) in these paths. If the transmission beam pattern is out of phase or otherwise phase-distorted, the signal transmitted by a base station at normal transmission power may not be correctly received and decoded by a user terminal. To compensate for the phase distortions, the base station may transmit data at a higher power level; however, increasing the transmission power acts as a load to the system, causing a reduction to the power that can be allocated to other terminals. In addition, the signal transmitted at higher power may interfere with other terminals, causing a reduction in signal quality.

One existing technique for antenna array calibration uses special calibration signals injected into the transmit path of the base station. The special calibration signals may interrupt and/or degrade the normal outbound traffic signals, which can negatively impact the network capacity and data throughput. Additionally, there are currently a wide variety of base stations that have different system configurations with multiple standards and multiple carriers. The use of the special calibration signals by these base stations may result in standards non-compliance and/or violate regulatory requirements.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 3 illustrates an example of de-convolution computation in a transmitter having a single transmit path.

FIG. 4 illustrates an example of de-convolution computation in a transmitter having multiple transmit paths.

SUMMARY

Figure 1:
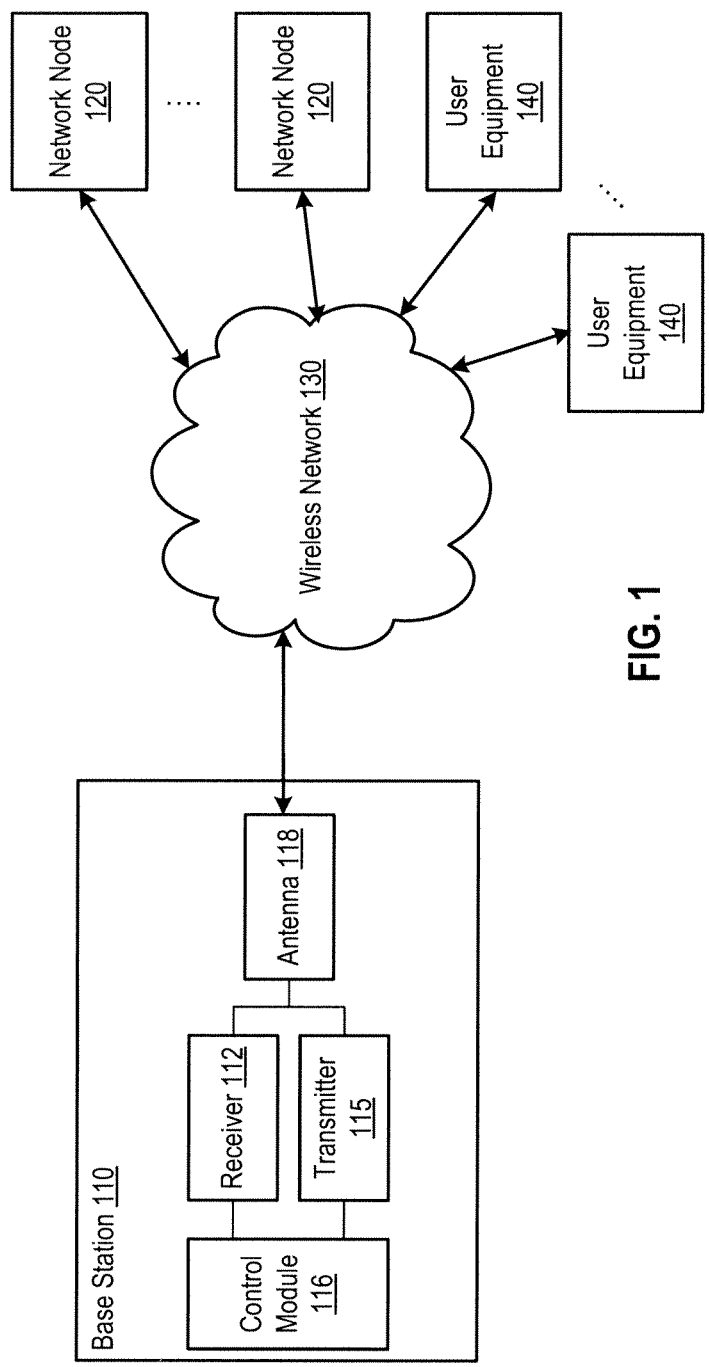
FIG. 1 illustrates an example of a wireless network environment in which an embodiment of the invention may operate.

Embodiments of the invention calibrate an antenna array of a base station using outbound traffic signals. The calibration removes distortion incurred by the transmit paths in a base station. The antenna array includes a plurality of sub-arrays coupled to the transmit paths for transmitting outbound traffic signals to a wireless network.

In one embodiment, a method of calibration of the antenna array using outbound traffic signals is disclosed. The method comprises combining the outbound traffic signals in the sub-arrays into a feedback signal by a combiner in the antenna array, and simultaneously capturing the outbound traffic signals for use as reference signals before the outbound traffic signals enter the transmit paths. Each of the reference signals is one of the outbound traffic signals that is to be transmitted via one of the sub-arrays. The method further comprises performing an impairment estimation for each of the outbound traffic signals based on the feedback signal and the reference signals, and applying an approximate inverse of the impairment estimation to the outbound traffic signals before the outbound traffic signals enter the transmit paths.

In another embodiment, a network node functioning as a base station that performs calibration of the antenna array using outbound traffic signals is disclosed. The base station comprises a combiner in the antenna array that combines the outbound traffic signals in the sub-arrays into a feedback signal. The outbound traffic signals are captured simultaneously for use as reference signals before the outbound traffic signals enter the transmit paths in a radio unit of the base station. Each of the reference signals is one of the outbound traffic signals that is to be transmitted via one of the sub-arrays. The base station further comprises an impairment estimator that estimates the impairment for each of the outbound traffic signals based on the feedback signal and the reference signals. The base station further comprises a plurality of equalizers that apply an approximate inverse of the impairment estimation to the outbound traffic signals before the outbound traffic signals enter the transmit paths.

In some embodiments, correlations between the outbound traffic signals are detected and removed by conditioning the outbound traffic signals.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention provide for an antenna array calibration technique that uses normal outbound traffic signals for calibration. The term "outbound traffic signals," as used herein, refers to the traffic signals that are to be transmitted from the antenna array to other network nodes or user equipment. The technique calibrates the antenna array in the transmit direction. The technique does not use any special calibration signal injected into the base station (e.g., an RBS). As normal outbound traffic signals are used for calibration, the calibration does not interrupt or interfere with the ongoing traffic signals, and therefore does not impact system availability and signal quality. In addition, as the calibration does not incur interruption of normal system operation, the calibration can be performed at all times to account for changes in operating conditions such as temperature changes.

In one embodiment, the calibration can be performed entirely within the radio unit of a base station using the feedback signal from the antenna module, without involving other parts of the base station and the network. Confining the calibration within the radio unit can simplify the hardware and software design and lower the cost of the system. Moreover, the radio unit in a base station is typically multi-standard, which also means that the radio unit is agnostic to the specific radio standard (i.e., Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. It is to be appreciated that embodiments of the invention are not so limited; in some embodiments, the calibration can be performed by the radio unit and other parts of the base station, the baseband unit. However, the digital circuitry in the baseband unit is generally multi-standard in hardware, but typically uses unique software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit. The calibration technique described herein may be implemented in both time-division duplex (TDD) and frequency-division duplex (FDD) systems.

According to one embodiment, the antenna array described herein combines outbound traffic signals to form a feedback signal. The feedback signal is de-convolved with a set of reference signals, which are outbound traffic signals captured before they enter the transmit paths. The correlation between the outbound traffic signals is detected. If the correlation exceeds a threshold, the outbound traffic signals are conditioned by slight phase and/or amplitude variations as a function of time to reduce the correlation.

FIG. 1 illustrates an example of a network architecture in which an embodiment of the invention may operate. A base station 110, such as an RBS, is coupled to one or more network nodes 120 (e.g., other base stations) and/or user equipment 140 (e.g., mobile phones) via a wireless network 130. The wireless network 130 operates in compliance with a wireless communication standard, such as LTE, GSM, CDMA, WCDMA, etc. The base station 110 includes a receiver module 112, a transmitter module 115, both of which are coupled to an antenna module 118 for signal transmission and reception. The receiver module 112 and the transmitter module 115 may also be coupled to a controller module 116 that controls the transmission and reception operations. It is understood that the base station 110 of FIG. 1 is a simplified representation; additional circuitry may be included in a base station that performs the antenna array calibration described herein.

Figure 2:
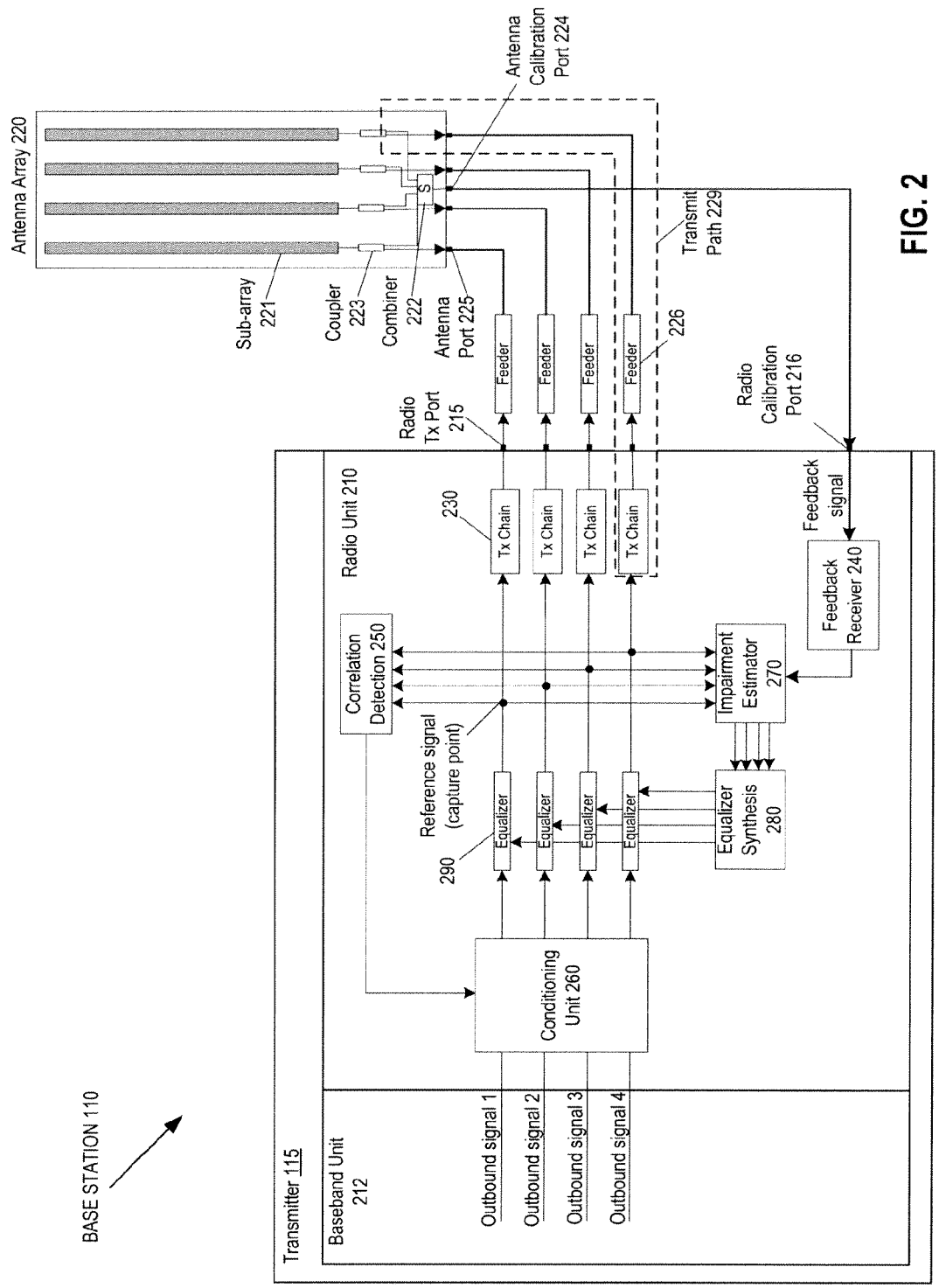
FIG. 2 is a block diagram illustrating antenna array calibration using outbound traffic signals according to one embodiment.

FIG. 2 illustrates a diagram of a portion of the transmitter module 115 in the base station 110 that performs antenna array calibration according to one embodiment. In this embodiment, the transmitter module 115 includes a radio unit 210 and a baseband unit 212 coupled to an antenna array 220 (corresponding to the antenna module 118 of FIG. 1) that has multiple sub-arrays 221. Although four sub-arrays 221 are shown in this embodiment, it is understood that any number of sub-arrays may be used. The four sub-arrays 221 carry four outbound traffic signals that have been phase-controlled for transmission. Each of the outbound traffic signals is a "normal traffic signal" (or simply referred to as "traffic signal") as the signal carries data or other communication information for transmission to another network node or user equipment. The sub-arrays 221 are coupled to the radio unit 210 of the base station 110 via respective antenna ports 225 and corresponding radio transmit ports 215 at the radio unit 210. Between the antenna ports 225 and the radio transmit ports 215 are multiple feeders 226, one for each transmit path. The term "transmit path" as used herein refers to the path traversed by an outbound traffic signal after the signal enters a transmit (Tx) chain 230 and before the signal enters a sub-array 221. An example of a transmit path is shown in FIG. 2 by the dotted box labeled as a transmit path 229. The transmit path 229 includes a transmit (Tx) chain 230 and all of the interconnect including a feeder 226 up to a coupler 223 inside the antenna array 220. In practice the transmit path 229 may also include duplexers, TMAs, combiners, diplexers, etc., such as would be appreciated by one skilled in the art. There is a one-to-one correspondence between a transmit chain and a transmit path; that is, each transmit path has only one transmit chain.

To perform antenna array calibration, the outbound traffic signals are coupled by respective couplers 223 and combined (i.e., summed up) by a combiner 222 in the antenna array 220 to produce a feedback signal. The combiner 222 combines the outbound traffic signals from all of the sub-arrays 223 into a single feedback signal. This feedback signal is routed to a feedback receiver 240 through an antenna calibration port 224 and a corresponding radio calibration port 216 at the radio unit 210.

The radio unit 210 is responsible for converting baseband signals into radio frequency (RF) signals for transmission. The radio unit 210 includes the transmit chains 230, one for each transmit path. The transmit chains 230 are the boundary between digital processing and analog processing in the base station 110, as each transmit chain 230 converts an outbound traffic signal from digital to analog. Each transmit chain 230 includes a number of analog components, such as one or more digital-to-analog converters, mixers, filters, power amplifiers, etc. These analog components in the transmit chains 230, together with the feeders 226 and other components along the analog portion of the transmit paths up to the antenna ports 225, generally incur linear phase and/or linear amplitude impairment to the outbound traffic signals. Significant non-linearities in the transmit path (such as the power amplifier) are typically taken care of by non-linear pre-distortion techniques.

To calibrate and compensate for the linear impairment of phase and/or amplitude, normal outbound traffic signals in the transmit paths are simultaneously captured in the radio unit 210 before these signals enter the transmit chains 230. These captured signals are used as reference signals, each of which is an outbound traffic signal to be transmitted by one of the transmit chains 230 via one of the sub-arrays 221. The outbound traffic signals at the capture point have not been impaired by the analog components in the transmit paths, and, therefore, are suitable for serving as reference signals. The feedback signal, on the other hand, is formed after each outbound traffic signal has gone through the analog portion of the transmit path. Thus, the feedback signal is a sum of the impaired outbound traffic signals. The calibration technique described herein uses the unimpaired reference signals and the impaired sum of the traffic signals to estimate the impairment in the transmit path and to thereby remove the impairment from the outbound traffic signals. In some cases, only the differences in the impairments of the transmit paths need to be removed from the outbound traffic signals to obtain good system performance.

The feedback signal from the combiner 222 is sent to the feedback receiver 240, which down-converts and digitizes the feedback signal to produce a digitized feedback signal. The digitized feedback signal is sent to an impairment estimator 270 to be processed with the reference signals.

In one embodiment, the impairment estimator 270 aligns the feedback signal with the reference signals in time, and performs a de-convolution of the reference signals jointly with the feedback signal. The result of the de-convolution is an estimated impairment for each transmit path. As the effect of impairment is equivalent to convolving the reference signals with the impairment, the impairment may be calculated by de-convolving the reference signals with the impaired feedback signal. Examples of the de-convolution computation will be described in detail below with reference to FIG. 3 and FIG. 4. The de-convolution can be solved by direct or iterative methods.

Based on the estimated impairment from the impairment estimator 270, an equalizer synthesis unit 280 computes an approximate inverse to the impairment in the frequency range occupied by the outbound traffic signals. The equalizer synthesis unit 280 produces a set of equalizer taps representative of the approximate inverse to the impairment. The equalizer synthesis unit 280 then sets the tap values of the corresponding equalizers 290 according to the equalizer taps. In one embodiment, each equalizer 290 is a complex finite impulse response (FIR) filter with one or more taps (i.e., equalizer taps). The finite impulse response is an approximate inverse to the transfer function of impairment in the transmit path from the transmit chain 230 to the antenna port 225. As such, each outbound traffic signal processed by the equalizer 290 is pre-distorted such that the pre-distortion cancels out the impairment in the transmit path.

In one embodiment, the base station 110 also includes a correlation detection unit 250 to detect a degree of correlation between the outbound traffic signals. The correlation detection may be performed by a cross-correlation computation between each outbound traffic signal and all of the other outbound traffic signals. If the correlation between any pair of the outbound traffic signals exceeds a predetermined threshold, the correlation detection unit 250 may activate a conditioning unit 260 on the transmit paths to condition the outbound traffic signals. If the correlation is below the threshold, the outbound traffic signals may bypass the conditioning unit 260, or may de-activate the conditioning unit 260 from performing signal conditioning. In one embodiment, the conditioning unit 260 conditions the outbound traffic signals before the outbound traffic signals enter the equalizers 290 before the outbound traffic signals enter the equalizers 290.

In one embodiment, if the correlation of the outbound traffic signals exceeds the threshold, then the outbound traffic signal phases and/or amplitudes may be varied slightly as a function of time. This amounts to wobbling the spatial antenna patterns slightly over time. The slight phase and/or amplitude variation reduces the correlation. The slight phase and/or amplitude variation is transparent to other network nodes and user equipment that are in communication with the base station 110, as these network nodes and user equipment can equalize and compensate for this slight variation.

There are many different options for implementing the phase and/or amplitude variations. In one embodiment, a low power replica is added to each outbound traffic signal, or to the outbound traffic signal that is found to be correlated with another outbound traffic signal. One or more of the following can be applied to the low power replica: a) A small unique frequency offset is applied to some or all low power replicas as appropriate. b) A small unique delay offset is applied to some or all low power replicas as appropriate. c) A unique filter is applied to some or all low power replicas as appropriate. It is understood that embodiments are not so restricted and other phase and/or amplitude variations may be used.

In the general case where the outbound traffic signals are not correlated (e.g., not exceeding a predetermined threshold), the calibration technique described with reference to FIG. 2 is able to make use of actual traffic signals carrying live traffic for calibration, thus avoiding the injection of specially created calibration signals. Therefore, the error vector magnitude (EVM) of the outbound traffic signals is not degraded since the signals are not being interrupted by injected calibration signals. In addition, because the calibration technique described herein has no or negligible impact on the outbound traffic signal EVM, antenna calibration can be performed on an ongoing basis while in service with minimal service impact. In the special case where the outbound traffic signals are correlated (e.g., exceeding a predetermined threshold) as in beam-forming applications, the calibration technique described herein provides a conditioning solution that has no or negligible impact on the outbound traffic signal EVM.

Although FIG. 2 shows that the calibration functions are performed entirely in the radio unit 210, some or all of the calibration functions can be performed in the baseband unit 212 of the base station 110. In some embodiments, the calibration functions may be performed in the radio unit 210, the baseband unit 212, and/or other portions of the base station 110.

In one embodiment, the impairment estimation and equalization are performed in a continuous loop, where the feedback signal and reference signals are continuously captured over time and are continuously used to refine the equalizer taps. The computation of impairment estimation and equalization can be performed offline or in real-time. For example, a block of reference signals captured over a period of time may be used in offline processing in order to obtain an accurate impairment estimation and equalization. Alternatively, real-time processing may be more responsive to changes in operating conditions. In some embodiments, the base station 110 may dynamically switch between offline and real-time processing based on the current operating conditions.

In the following, examples of impairment estimation and equalization are described. In one embodiment, the impairment estimation is performed by de-convolution of the reference signals and the feedback signal. As described above with reference to FIG. 2, the de-convolution may be computed by the impairment estimator 270, and the de-convolution result is the estimated impairment.

FIG. 3 illustrates an example of de-convolution computation for a radio unit having only one transmit path according to one embodiment. Assume that $S_e(t)$ is the outbound traffic signal, $h(\tau)$ is the transmit path impairment impulse response, $n_{FB}(t)$ is Gaussian noise in the feedback path and $S_{FB}(t)$ is the feedback signal. The feedback signal can be written as: $S_{FB}(t)=h(\tau)*S_e(t)+n_{FB}(t)$, where * is the convolution operation.

As $h(\tau)*S_e(t)=S_{FB}(t)-n_{FB}(t)$, the estimated impairment can be found as: $h'(\tau)=[S_{FB}(t)-n_{FB}(t)]*^{-1}S_e(t)$, where $*^{-1}$ is the de-convolution. This de-convolution can be solved directly by division in the frequency domain or by iterative de-convolution algorithms such as the iterative least mean squares (LMS). Computation of the de-convolution may be performed by a general-purpose processor executing de-convolution, a special-purpose hardware device (e.g., an Application-Specific Integrated Circuit (ASIC)), firmware, or a combination of the above. The estimated impairment $h'(\tau)$ can be fed into the equalizer synthesis unit 280 to compute an approximate inverse $h_e(\tau)$ of the impairment for use in the equalizer 290.

FIG. 4 illustrates an example of de-convolution computation for a radio unit having p transmit paths according to one embodiment. Assume that $S_e(m,t)$ is the $m^{th}$ traffic signal, $h(m,\tau)$ is the impairment impulse response of the $m^{th}$ transmit path, $n_{FB}(t)$ is Gaussian noise in the feedback path and $S_{FB}(t)$ is the combined feedback signal.

Assuming that there are four transmit paths, p=4, the feedback signal $S_{FB}(t)$ can be written as:

$$S_{FB}(t)=h(1,\tau)*S_e(1,t)+h(2,\tau)*S_e(2,t)+h(3,\tau)*S_e(3,t)+h(4,\tau)*S_e(4,t)+n_{FB}(t),$$

where * is the convolution operator.

The estimated impairments $h'(1,\tau)$, $h'(2,\tau)$, $h'(3,\tau)$, $h'(4,\tau)$ can be found as:

$$[h'(1,\tau),h'(2,\tau),h'(3,\tau),h'(4,\tau)]=[S_{FB}(t)-n_{FB}(t)]\overline{*}^{-1}[S_e(1,t),S_e(2,t),S_e(3,t),S_e(4,t)]$$

where $\overline{*}^{-1}$ is a joint de-convolution operator. This joint de-convolution can be solved directly by a pseudo-inverse in the frequency domain or with iterative algorithms such as the iterative least mean squares (LMS). Computation of the joint de-convolution may be performed by a general-purpose processor executing joint de-convolution, a special-purpose hardware device (e.g., an Application-Specific Integrated Circuit (ASIC)), firmware, or a combination of the above. The estimated impairment $h'(1,\tau)$, $h'(2,\tau)$, $h'(3,\tau)$, $h'(4,\tau)$ can be fed into the equalizer synthesis unit 280 to compute an approximate inverse $h_e(1,\tau)$, $h_e(2,\tau)$, $h_e(3,\tau)$, $h_e(4,\tau)$ of the impairment for use in the equalizers 290.

The joint de-convolution described in FIG. 4 is computed "jointly" with respect to the four reference signals, and is different from computing four individual de-convolutions separately. In one embodiment, four or more blocks of time domain data are captured for each of the reference signals and the feedback signal, where each block of data contains a time series of the signal sampled over a period of time. These blocks of data are converted to the frequency domain. For each frequency bin in the frequency domain, each block of captured data can be used to construct a linear equation having four unknown impairments. Thus, the four or more blocks of captured data can be used to construct a linear system of four or more linear equations having the four unknown impairments. With these four or more equations, the impairment estimator 270 can compute a matrix inverse (in the case of four equations) or pseudo-inverse (in the case of more than four equations) to solve for the four impairment unknowns per frequency bin. Using more than four equations may average out the noise on the feedback signal and thereby improve the signal-to-noise ratio. The frequency domain solutions may be converted back to the time domain to obtain the estimated impairment $h'(1,\tau)$, $h'(2,\tau)$, $h'(3,\tau)$, $h'(4,\tau)$.

Figure 5:
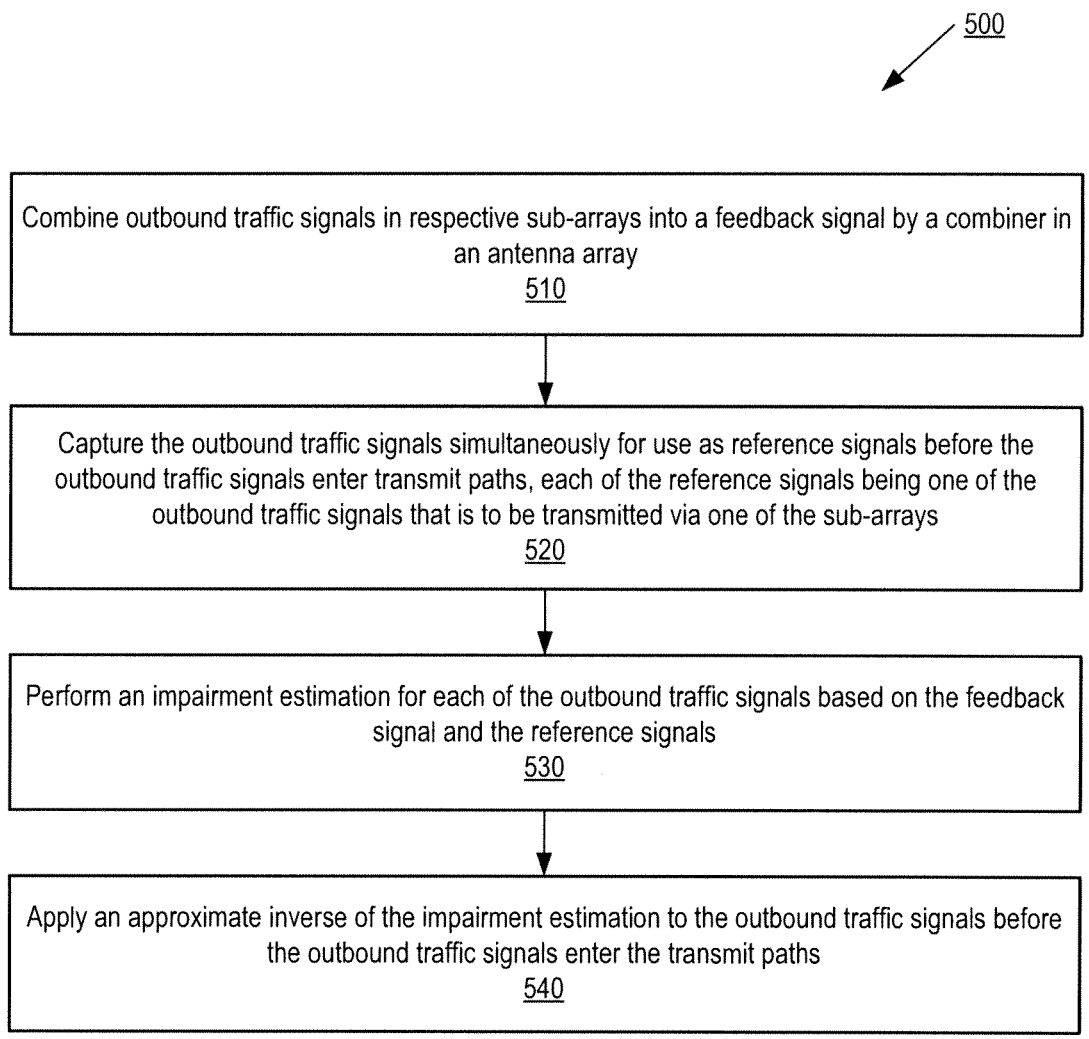
FIG. 5 is a flow diagram illustrating a method of antenna array calibration using outbound traffic signals according to one embodiment.

FIG. 5 illustrates a method 500 for antenna array calibration according to one embodiment. The method 500 may be performed by the embodiment of the base station described above with reference to FIG. 1 and FIG. 2. In one embodiment, an antenna array of the base station includes a plurality of sub-arrays coupled to the transmit paths in the radio unit for transmitting outbound traffic signals to a wireless network. A combiner in the antenna array combines the outbound traffic signals in the sub-arrays into a feedback signal (block 510). The outbound traffic signals are captured simultaneously for use as reference signals before the outbound traffic signals enter the transmit paths (block 520). Each of the reference signals is one of the outbound traffic signals that is to be transmitted via one of the sub-arrays. An impairment estimator of the base station estimates the impairment for each of the outbound traffic signals based on the feedback signal and the reference signals (block 530). An approximate inverse of the impairment estimation is applied to the outbound traffic signals by a plurality of equalizers before the outbound traffic signals enter the transmit paths (block 540).

The operations of the diagram of FIG. 5 have been described with reference to the exemplary embodiments of FIG. 1 and FIG. 2. However, it should be understood that the operations of the diagram of FIG. 5 can be performed by embodiments of the invention other than those discussed with reference to FIG. 1 and FIG. 2, and the embodiments discussed with reference to FIG. 1 and FIG. 2 can perform operations different from those discussed with reference to the diagram of FIG. 5. While the diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network node (e.g., a router, switch, bridge, controller, base station) is a piece of networking equipment, including hardware and software, that communicatively interconnects other equipment on the network (e.g., other network nodes, user equipment, etc.). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network nodes, which are coupled (e.g., through one or more core network nodes) to other edge network nodes, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for calibrating an antenna array of a base station to remove distortion incurred by transmit paths in a base station, the antenna array including a plurality of sub-arrays coupled to the transmit paths for transmitting outbound traffic signals to a wireless network, the method comprising the steps of:
    combining the outbound traffic signals in respective ones of the sub-arrays into a feedback signal by a combiner in the antenna array;
    capturing the outbound traffic signals simultaneously for use as reference signals before the outbound traffic signals enter the transmit paths, each of the reference signals being one of the outbound traffic signals that is to be transmitted via one of the sub-arrays;
    performing an impairment estimation for each of the outbound traffic signals based on the feedback signal and the reference signals; and
    applying equalizer taps with values representing an approximate inverse of the impairment estimation to each of the outbound traffic signals before the outbound traffic signals enter the transmit paths to thereby remove the distortion incurred by the transmit paths.

2. The method of claim 1, wherein the step of performing the impairment estimation further comprises the step of performing a de-convolution of the reference signals jointly with the feedback signal.

3. The method of claim 2, wherein performing the impairment estimation further comprises the step of:
    down-converting and digitizing the feedback signal into a series of digital signals; and
    aligning the digital signals and the reference signals in time before performing the de-convolution.

4. The method of claim 1, further comprising the steps of:
    detecting a correlation between the reference signals; and
    conditioning the outbound traffic signals when the correlation exceeds a threshold.

5. The method of claim 4, wherein the step of applying equalizer taps with values representing the approximate inverse of the impairment estimation is performed after the step of conditioning and before the step of detecting the correlation.

6. The method of claim 4, wherein the step of conditioning further comprises the step of applying a unique frequency offset, a unique delay offset, or a unique filter to one or more low power replicas of the outbound traffic signals.

7. The method of claim 1, wherein the step of applying equalizer taps with values representing the approximate inverse further comprises the step of calculating the values of the equalizer taps before the outbound traffic signals are captured for use as the reference signals.

8. The method of claim 1, wherein the step of applying equalizer taps with values representing the approximate inverse is performed before the outbound traffic signals are captured for use as the reference signals.

9. The method of claim 1, wherein the steps of capturing, applying and performing are performed entirely in the radio unit of the base station.

10. The method of claim 1, wherein one or more of the steps of capturing, applying and performing are performed in a baseband unit of the base station.

11. The method of claim 1, wherein the distortion incurred by the transmit paths includes linear phase distortion, linear amplitude distortion, or a combination of linear phase and linear amplitude distortions.

12. A base station that performs calibration of an antenna array to remove distortion incurred by transmit paths in the base station, the antenna array including a plurality of sub-arrays coupled to the transmit paths for transmitting outbound traffic signals to a wireless network, the base station comprising:
    a combiner in the antenna array adapted to combine the outbound traffic signals in respective ones of the sub-arrays into a feedback signal;
    a feedback receiver adapted to receive the feedback signal from the combiner;
    an impairment estimator coupled to the feedback receiver, the impairment estimator adapted to receive the outbound traffic signals that are simultaneously captured before entering the transmit paths for use as reference signals, and to perform an impairment estimation for each of the outbound traffic signals based on the feedback signal from the feedback receiver and the reference signals, wherein each of the reference signals is one of the outbound traffic signals that is to be transmitted via one of the sub-arrays; and
    a plurality of equalizers coupled to the impairment estimator, the plurality of equalizers adapted to apply equalizer taps with values representing an approximate inverse of the impairment estimation to each of the outbound traffic signals before the outbound traffic signals enter the transmit paths to thereby remove the distortion incurred by the transmit paths.

13. The base station of claim 12, wherein the feedback receiver is further adapted to down-convert and to digitize the feedback signal into a series of digital signals.

14. The base station of claim 12, wherein the impairment estimator is further adapted to perform a de-convolution of the reference signals jointly with the feedback signal.

15. The base station of claim 14, wherein the impairment estimator is further adapted to align the feedback signal and the reference signals in time before the de-convolution is performed.

16. The base station of claim 12, further comprising a correlation detection unit adapted to detect a correlation between the reference signals after the equalizer taps with values representing the approximate inverse of the impairment estimation are applied to the outbound traffic signals.

17. The base station of claim 16, further comprising a conditioning unit coupled to the correlation detection unit, the conditioning unit adapted to condition the outbound traffic signals when the correlation exceeds a threshold before the equalizer taps with values representing the approximate inverse of the impairment estimation are applied to the outbound traffic signals.

18. The base station of claim 17, wherein the conditioning unit is further adapted to apply a unique frequency offset, a unique delay offset, or a unique filter to one or more low power replicas of the outbound traffic signals.

19. The base station of claim 12, wherein the calibration of the antenna array is performed entirely in the radio unit of the base station.

20. The base station of claim 12, wherein the calibration of the antenna array is performed in the radio unit and in a baseband unit of the base station.

21. The base station of claim 12, wherein the distortion incurred by the transmit paths includes linear phase distortion, linear amplitude distortion, or a combination of linear phase and linear amplitude distortions.

* * * * *

UNITED STATES PATENT AND TRADEMARK OFFICE
CERTIFICATE OF CORRECTION

PATENT NO. : 9,025,575 B2  
APPLICATION NO. : 13/677781  
DATED : May 5, 2015  
INVENTOR(S) : McGowan et al.

Page 1 of 1

It is certified that error appears in the above-identified patent and that said Letters Patent is hereby corrected as shown below:

Specification

In Column 3, Line 31, delete "station," and insert -- station, e.g., --, therefor.

In Column 4, Line 40, delete "sub-arrays 223" and insert -- sub-arrays 221 --, therefor.

In Column 7, Line 33, after Equation, insert -- , --.

Signed and Sealed this  
Twelfth Day of April, 2016

Michelle K. Lee  
*Director of the United States Patent and Trademark Office*